United States Patent
Ahrens

(10) Patent No.: US 9,556,051 B2
(45) Date of Patent: Jan. 31, 2017

(54) METHODS FOR CONTROLLING THE THICKNESS WEDGE IN A GLASS RIBBON

(71) Applicant: Corning Incorporated, Corning, NY (US)

(72) Inventor: Jeffrey Howard Ahrens, Pine City, NY (US)

(73) Assignee: CORNING INCORPORATED, Corning, NY (US)

( * ) Notice: Subject to any disclaimer, the term of this patent is extended or adjusted under 35 U.S.C. 154(b) by 123 days.

(21) Appl. No.: 14/492,580

(22) Filed: Sep. 22, 2014

(65) Prior Publication Data

US 2016/0083281 A1    Mar. 24, 2016

(51) Int. Cl.
| C03B 17/06 | (2006.01) |
| G05B 1/00 | (2006.01) |
| G01B 21/08 | (2006.01) |

(52) U.S. Cl.
CPC .............. *C03B 17/064* (2013.01); *G05B 1/00* (2013.01); *G01B 21/08* (2013.01)

(58) Field of Classification Search
CPC .................................................. C03B 17/064
See application file for complete search history.

(56) References Cited

U.S. PATENT DOCUMENTS

| 6,997,017 | B2* | 2/2006 | Pitbladdo | C03B 17/064 65/195 |
| 7,690,221 | B2* | 4/2010 | Pitbladdo | C03B 17/064 65/195 |
| 8,196,431 | B2 | 6/2012 | Burdette et al. | 65/29.14 |
| 8,393,177 | B2 | 3/2013 | Boratav et al. | 65/128 |
| 8,459,062 | B2* | 6/2013 | Ahrens | C03B 17/06 65/158 |
| 8,475,591 | B2 | 7/2013 | Kellerman et al. | |
| 8,904,822 | B2* | 12/2014 | LeBlanc | C03B 17/064 65/162 |
| 2003/0215610 | A1 | 11/2003 | DiGiampaolo et al. | |
| 2008/0282736 | A1* | 11/2008 | Filippov | C03B 17/064 65/90 |
| 2009/0217705 | A1* | 9/2009 | Filippov | C03B 13/04 65/99.1 |

(Continued)

FOREIGN PATENT DOCUMENTS

| CN | 203276037 U | 11/2013 |
| WO | 2011047008 A1 | 4/2011 |

(Continued)

OTHER PUBLICATIONS

Korean Intellectual Property Office; International Search Report and Written Opinion; Mail Date: Nov. 30, 2015; pp. 1-9.

*Primary Examiner* — Jodi C Franklin
(74) *Attorney, Agent, or Firm* — Kevin M. Able

(57) ABSTRACT

A method for controlling wedge variation in a glass ribbon includes flowing molten glass over converging sides of a forming vessel, drawing a glass ribbon from a root of the forming vessel, measuring the wedge variation over at least a portion of the width of the glass ribbon, adjusting a tilt of the forming vessel and a temperature near a weir of the forming vessel based on the measured wedge variation to decrease the wedge variation over the width of the glass ribbon, and re-measuring the wedge variation over the portion of the width of the glass ribbon.

10 Claims, 14 Drawing Sheets

(56) References Cited

U.S. PATENT DOCUMENTS

| | | | |
|---|---|---|---|
| 2010/0212360 A1* | 8/2010 | Delia | C03B 17/064 65/90 |
| 2013/0094714 A1* | 4/2013 | Ohto | G06T 7/0057 382/106 |
| 2013/0102228 A1* | 4/2013 | Tsuda | C03B 17/064 451/41 |
| 2013/0269390 A1 | 10/2013 | Pitbladdo | 65/29.14 |
| 2013/0312459 A1* | 11/2013 | Coppola | C03B 17/064 65/53 |
| 2014/0123703 A1* | 5/2014 | LeBlanc | C03B 17/064 65/29.1 |
| 2014/0238079 A1* | 8/2014 | Amosov | C03B 17/064 65/53 |
| 2014/0318182 A1* | 10/2014 | Coppola | C03B 17/067 65/29.21 |
| 2015/0232365 A1* | 8/2015 | Bisson | C03B 17/04 65/25.1 |

FOREIGN PATENT DOCUMENTS

| | | | |
|---|---|---|---|
| WO | 2011066064 A2 | 6/2011 | |
| WO | 2011149800 A2 | 12/2011 | |

\* cited by examiner

METHODS FOR CONTROLLING THE THICKNESS WEDGE IN A GLASS RIBBON

FIELD

The present specification generally relates to the manufacture of glass sheets and, more particularly, to methods for controlling the thickness wedge in glass ribbons from which glass sheets are produced.

TECHNICAL BACKGROUND

As glass substrates are used in a greater number of applications, the ability to control various attributes of the glass has become increasingly important. In particular, maintaining specified thickness attributes of the glass sheet is important for many consumer device applications, since variations outside of the specifications can impact the fit of the glass substrate and/or the final overall size of the device.

Conventionally, downdraw processes are used to manufacture a glass ribbon that can be singulated into discrete glass sheets. Flow and temperature variations in the molten glass from which the glass ribbon is formed can result in glass defects, such as variations in the sheet thickness and other effects. As such, controlling the flow and temperature of the glass can be used to minimize variations in the thickness of the glass ribbon. However, conventional methods that compensate for long term variations in the thickness of the glass ribbon can amplify short term variations in the thickness of the glass ribbon, resulting in increased manufacturing losses and production costs.

Accordingly, alternative methods for controlling the thickness in a glass ribbon are needed that address both long term and short term variations in the thickness to reduce thickness variations in glass sheets formed from the glass ribbon.

SUMMARY

According to one embodiment, a method for controlling wedge variation in a glass ribbon includes flowing molten glass over converging sides of a forming vessel, drawing a glass ribbon from a root of the forming vessel, measuring the wedge variation over at least a portion of the width of the glass ribbon, adjusting a tilt of the forming vessel and a temperature near a weir of the forming vessel based on the measured wedge variation to decrease the wedge variation over the width of the glass ribbon, and re-measuring the wedge variation over the portion of the width of the glass ribbon.

In another embodiment, a fusion draw device includes a forming vessel, a tilt mechanism, at least one heating mechanism, and an automatic thickness control system. The forming vessel has a first end, a second end, and a trough positioned in an upper surface thereof. The tilt mechanism tilts the forming vessel to change a position of the first end of the forming vessel relative to the second end of the forming vessel. The heating mechanism provides heat to an area at a weir of the forming vessel. The automatic thickness control system includes a controller with a processor and memory storing a computer readable and executable instruction set. When the instruction set is executed by the processor, the multivariable control system receives a wedge variation calculation from a thickness gauge in a bottom of draw; determines, based on the received wedge variation calculation, a high frequency component of the wedge variation and a low frequency component of the wedge variation; calculates a tilt setpoint to reduce the high frequency component of the wedge variation; calculates a temperature setpoint to reduce the low frequency component of the wedge variation; provides the tilt setpoint to the tilt mechanism; and provides the temperature setpoint to the at least one heating mechanism.

In yet another embodiment, a method of controlling a wedge variation over a width of a glass ribbon includes flowing molten glass over converging sides of an forming vessel; drawing a glass ribbon from a root of the forming vessel; measuring the wedge variation over a portion of the width of the glass ribbon; adjusting a tilt of the forming vessel based on a high frequency component of the wedge variation to decrease the wedge variation over the width of the glass ribbon; adjusting a temperature at a weir of the forming vessel based on a low frequency component of the wedge variation to decrease the wedge variation over the width of the glass ribbon; and measuring an adjusted wedge variation over the portion of the width of the glass ribbon.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
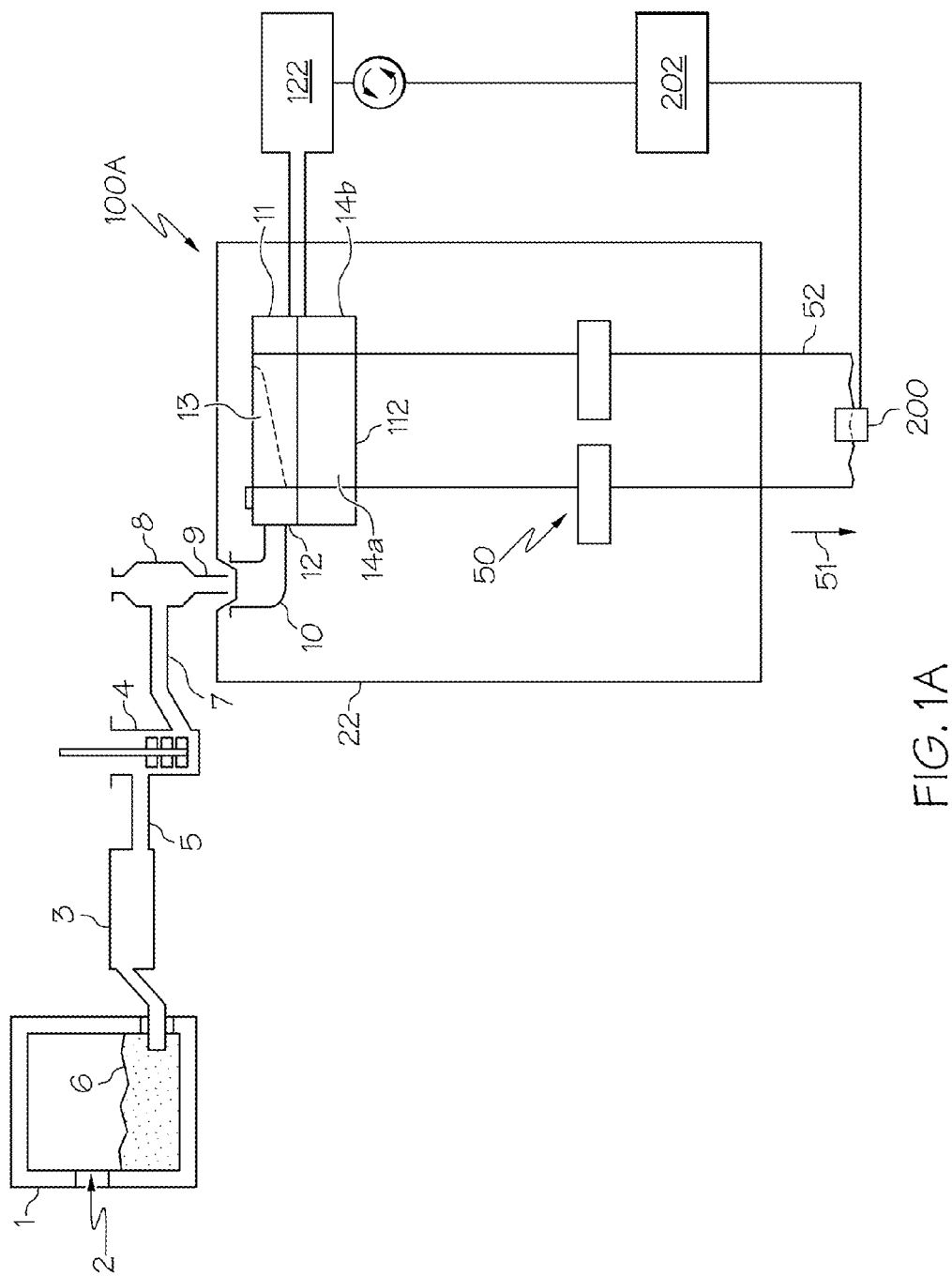
FIG. 1A illustrates a fusion draw process in accordance with one or more embodiments described herein.

Reference will now be made in detail to various embodiments of methods and apparatuses for controlling wedge variation in a glass ribbon, examples of which are illustrated in the accompanying drawings. Whenever possible, the same reference numerals will be used throughout the drawings to refer to the same or like parts. One embodiment of a fusion draw device is shown in FIG. 1B, and is designated generally throughout by the reference numeral 100. In general, the fusion draw device includes an forming vessel, a tilt mechanism tilting the forming vessel to change a position of a first end of the forming vessel relative to a second end of the forming vessel, at least one heating mechanism positioned in an upper portion of the fusion draw device providing heat to an area at or near a weir of the forming vessel, and an automatic thickness control system. The automatic thickness control system determines a tilt setpoint and a temperature setpoint based on the wedge variation to reduce the wedge variation in the glass ribbon. In particular, the automatic thickness control system provides the tilt setpoint to the tilt mechanism to reduce the high frequency component of the wedge variation and provides the temperature setpoint to the heating mechanism to reduce the low frequency component of the wedge variation. Various embodiments of methods and apparatuses for controlling wedge variation in a glass ribbon will be described herein with specific reference to the appended drawings.

Figure 1B:
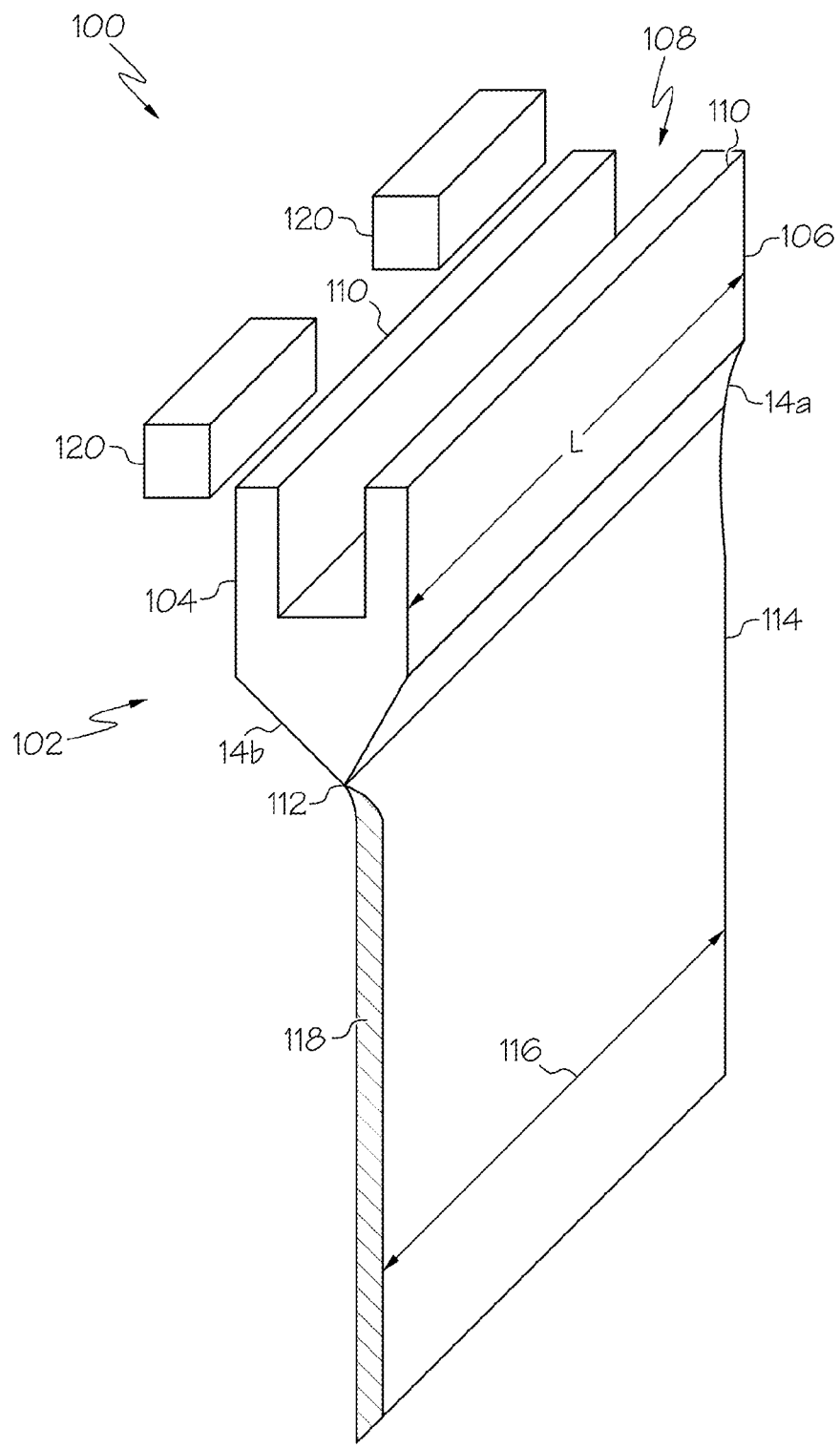
FIG. 1B is a perspective view of a fusion draw device in accordance with one or more embodiments described herein.

Referring now to FIG. 1A, an exemplary glass manufacturing apparatus 100A for forming glass substrates from molten glass is schematically depicted in which a fusion draw device is used to form the molten glass into glass substrates. The glass manufacturing apparatus 100A includes a melting vessel 1, a fining vessel 3, a mixing vessel 4, a delivery vessel 8, and a fusion draw device 100. Glass batch materials are introduced into the melting vessel 1 as indicated by arrow 2. The batch materials are melted to form molten glass 6. The fining vessel 3 has a high temperature processing area that receives the molten glass 6 from the melting vessel 1 and in which bubbles are removed from the molten glass 6. The fining vessel 3 is fluidly coupled to the mixing vessel 4 by a connecting tube 5. That is, molten glass flowing from the fining vessel 3 to the mixing vessel 4 flows through the connecting tube 5. The mixing vessel 4 is, in turn, fluidly coupled to the delivery vessel 8 by a connecting tube 7 such that molten glass flowing from the mixing vessel 4 to the delivery vessel 8 flows through the connecting tube 7.

The delivery vessel 8 supplies the molten glass 6 through a downcomer 9 into the fusion draw device 100. The fusion draw device 100 comprises an enclosure 22 in which an inlet 10, a forming vessel 11 and at least one draw assembly 50 are positioned. As shown in FIG. 1A, the molten glass 6 from the downcomer 9 flows into an inlet 10 which leads to the forming vessel 11. The forming vessel 11 includes an opening 12 that receives the molten glass 6 which flows into a trough 13 and then overflows and runs down two converging sides 14a and 14b of the forming vessel 11 before fusing together at a bottom edge 112 of the forming vessel 11, where the two sides join, hereinafter root 112. The resulting glass substrate is then drawn in a downward direction 51 by the draw assembly 50 as a continuous glass substrate 52, also referred to herein as a glass ribbon.

More specifically, as shown in FIG. 1B, the fusion draw device 100 includes a forming vessel 102 having a first end 104, a second end 106, and a trough 108 positioned in an upper surface thereof. The first end 104 and the second end 106 are perpendicular to converging sides 14a and 14b of the forming vessel 102 and are separated by a length L of the forming vessel 102. Molten glass is provided to the trough 108 from the first end 104 of the forming vessel 102 and flows over weirs 110 and along the outer surfaces of the forming vessel 102 until it reaches the root 112. The root 112 is formed by the convergence of the sides 14a and 14b of the forming vessel 102. At the root 112, the two sheets of molten glass flowing down each side of the forming vessel 102 join together to form a glass ribbon 114. The glass ribbon 114 is drawn from the root 112 of the forming vessel 102 by a plurality of edge rollers and pulling rolls (FIG. 1A). The glass ribbon 114 has a width 116 that runs parallel to the trough 108 and a thickness 118 that is perpendicular to the width 116 of the glass ribbon 114. The thickness 118 can vary along the width 116 of the glass ribbon 114. For example, the thickness 118 of the glass ribbon 114 near the first end 104 of the forming vessel 102 may be greater than the thickness of the glass ribbon 114 near the second end 106 and the thickness 118 of the glass ribbon 114 may increase linearly from the second end 106 to the first end 104 such that the glass ribbon 114 has a "wedge" shape along the width 116 of the glass ribbon 114. Consequently, as used herein, the slope of the thickness 118 along the width 116 of the glass ribbon 114 is called "wedge". In various embodiments, the wedge may represent the slope of the thickness 118 along a portion of the width 116 of the glass ribbon 114, such as a portion of the width 116 of the glass ribbon 114 that is not subject to end effects, as will be discussed below.

Several variables may affect the wedge. Specifically, the temperature at the weirs 110 may impact the wedge by influencing the viscosity of the glass as it flows over the forming vessel. For example, increasing the temperature near the weirs 110 encourages glass to flow from inlet end (i.e., the end of the forming vessel 102 near the inlet 10) to compression end (i.e., the end of the forming vessel 102 separated from the inlet 10 by the length L of the forming vessel 102) whereas decreasing the temperature inhibits the flow of molten glass across the forming vessel 102. To influence the temperature of the molten glass, the fusion draw device 100 also includes at least one heating mechanism 120 positioned adjacent to the weirs 110. In embodiments, the heating mechanism(s) 120 may be resistive heaters, gas-fired heaters, or the like. Although FIG. 1 illustrates a fusion draw device 100 having two heating mechanisms 120, a greater or fewer number of heating mechanisms may be employed, depending on the particular embodiment. For example, one or more heating mechanisms 120 can be positioned adjacent to each weir 110. The heating mechanisms 120 provide heat to an area at the weirs 110 of the forming vessel 102. The heating mechanisms 120 can be turned on or up (e.g., the heat output of the heating mechanism is increased) in order to actively heat the area at the weirs 110 of the forming vessel 102. Conversely, the heating mechanisms 120 can be turned off or turned down (e.g., the heat output of the heating mechanism is decreased) to passively cool the area at the weirs 110 of the forming vessel 102.

In some embodiments, the fusion draw device 100 can include an active cooling mechanism (not shown). The active cooling mechanism can use forced air, water, or another coolant to decrease the temperature at the area near the weirs 110 of the forming vessel 102. Accordingly, the temperature at the area near the weirs 110 of the forming vessel 102 can be controlled by actively heating, passively cooling, actively cooling, and/or a combination of actively heating and actively cooling the area near the weirs 110 of the forming vessel 102.

In addition to the temperature of the molten glass at the weirs 110 of the forming vessel 102, an amount of tilt of the forming vessel 102 also influences the wedge of the glass ribbon formed with the forming vessel 102. For example, down tilting the forming vessel 102 (i.e., raising the first end 104 of the forming vessel 102 relative to the second end 106 of the forming vessel 102) with the tilt mechanism 122 (shown in FIG. 1A) encourages the molten glass to flow from the first end 104 to the second end 106. Conversely, uptilting the forming vessel 102 (i.e., lowering the first end 104 relative to the second end 106) with the tilt mechanism 122 inhibits the flow of molten glass across the forming vessel 102. Therefore, in various embodiments, the fusion draw device 100 utilizes the tilt mechanism 122 to tilt the forming vessel 102 to change a position of the first end 104 of the forming vessel 102 relative to the second end 106 of the forming vessel 102 and thereby increase or decrease the flow of molten glass over the weirs 110 of the forming vessel which, in turn, affects the wedge of the glass ribbon formed with the forming vessel 102.

In various embodiments, wedge variation is controlled through a combination of tilting the forming vessel 102 and adjusting a temperature near the weirs 110. More particularly, the forming vessel 102 can be tilted to decrease a high frequency (e.g., short term) component of wedge variation while the temperature can be adjusted via the heating mechanisms 120 to decrease a low frequency (e.g., long term) component of wedge variation. As used herein, the term "high frequency" refers to periods of about three hours or less and the term "low frequency" refers to periods of about ten hours or greater. However, the high frequency and low frequency components of the wedge variation can vary depending on the particular embodiment, provided that there is some band separation between the high and low frequencies. The desired level of band separation between the high frequency and low frequency components can depend on the level of control over the variables. Frequencies between the defined high frequency and low frequency ranges, for the purpose of controlling the wedge, can be ignored for calculations and will naturally be adjusted based on the control of the high frequency and low frequency components. For example, because thermal adjustments take time for the glass to respond (i.e., heat up or cool down) and, as such, more slowly impact the thickness distribution across the width 116 of the glass ribbon 114, temperature adjustments at the weirs 110 may be used to decrease the wedge variation over long periods of time, such as tens of hours or even days. However, temperature adjustments are ineffective for controlling wedge variations in the short term. Therefore, to quickly address the wedge variation and reduce the overall amount of glass ribbon 114 that exceeds a predetermined range of variation in wedge, the forming vessel 102 can be tilted, which much more rapidly impacts the thickness distribution across the glass ribbon than temperature adjustments.

Adjusting the tilt alone may be used to compensate for both low and high frequency variation. However, the change in tilt angle required to address low-frequency variations can be relatively large and may have negative consequences for the fusion draw device. For example, large changes in the tilt angle can result in noticeable ribbon position changes which could negatively impact ribbon shape due to the interaction between the glass ribbon and the pulling rolls lower in the draw, and ultimately impact the shape of the final glass sheet cut from the ribbon. Accordingly, in various embodiments, tilt is employed to address the high-frequency variations in wedge while the temperature near the weirs is adjusted to compensate for low-frequency variations in wedge. This enables smaller tilt moves to be employed and allows for relatively quick control and correction of wedge variations.

Figure 2:
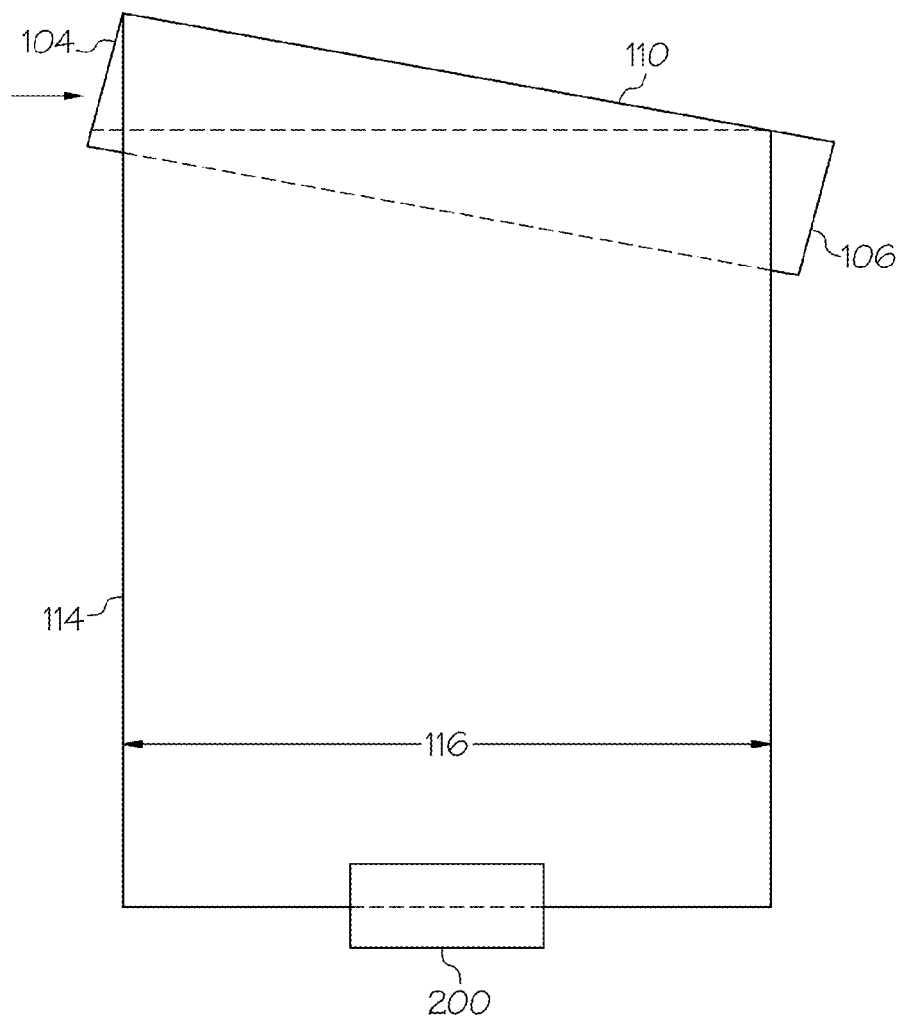
FIG. 2 is a side view of a fusion draw device in accordance with one or more embodiments described herein.

Referring now to FIG. 2, a side view of a tilted forming vessel 102 is depicted according to one or more embodiments. As an example, the wedge variation across the width of the glass ribbon 114 can be determined with a thickness gauge 200. The thickness gauge can be located at a bottom of draw of the fusion draw device. The thickness gauge 200 can be, for example, a laser-based thickness gauge. The thickness gauge 200 measures the thickness of the glass ribbon 114 over at least a portion of the width of the glass ribbon 114. On either end of the forming vessel 102, so-called "end effects" can increase the flow density, resulting in a thickness increase of the glass ribbon 114 at its two vertical boundaries. The increased thickness occurs over a finite width extending towards a center of the glass ribbon 114 from the vertical boundaries, each of which is called a "bead region." In various embodiments, the thickness of the glass ribbon 114 is measured in a portion of the width of the glass ribbon 114 that does not include the bead regions of the glass ribbon 114, for example at a center line of the glass ribbon. In various embodiments, the wedge is measured over the width of the glass ribbon 114 that does not include the bead regions.

Based upon the wedge variation calculated by the thickness gauge 200, the tilt mechanism 122 may be used to change the position of the first end 104 of the forming vessel 102 relative to the second end 106 of the forming vessel 102. When the first end 104 is higher than the second end 106, more molten glass will flow to the second end 106, thickening the glass ribbon 114 near the second end 106. Lowering the first end 104 of the forming vessel 102 by an amount effective to decrease the height differential between the first end 104 and the second end 106 can result in a thinner glass ribbon 114 near the second end 106. Thus, changes in the tilt of the forming vessel 102 adjust the wedge variation over the width 116 of the glass ribbon 114.

Referring now to FIGS. 1A-2, to control the wedge variation of the glass ribbon 114, the temperature and tilt of the forming vessel 102 are controlled by a multivariable control system 202 of the fusion draw device 100 (shown in FIG. 1A), which operates to adjust the temperature and tilt of the forming vessel 102 based on a calculated wedge variation based on a received thickness measurement. The multivariable control system 202 is communicatively coupled to the thickness gauge 200 and the heating mechanism(s) 120 and generally includes a controller with a processor and a memory for storing a computer readable and executable instruction set. In various embodiments, the adjustment of the temperature and tilt is an iterative process based on measuring and re-measuring the wedge variation over time. When the processor of the multivariable control system 202 executes the computer readable and executable instruction set, the instruction set causes the controller to receive a wedge variation signal from the thickness gauge and determine, based on the received wedge variation signal, a high frequency component of the wedge variation and a low frequency component of the wedge variation. The high frequency component and the low frequency component of the wedge variation can be determined, for example, by automatically identifying peaks in a Fourier transform of the wedge variation signal or by determining a variation within a user-defined window corresponding to "high frequency" and "low frequency." The instruction set also causes the controller to calculate a tilt setpoint to reduce the high frequency component of the wedge variation and to calculate a temperature setpoint to reduce the low frequency component of the wedge variation. The instruction set also causes the controller to provide the tilt setpoint to the tilt mechanism and provide the temperature setpoint to the heating mechanism. The processor of the multivariable control system can execute these instructions in a variety of ways, depending on the particular embodiment. For example, a block diagram of a method 300 for controlling the wedge variation in a glass ribbon according to one embodiment is shown in FIG. 3.

Figure 3:
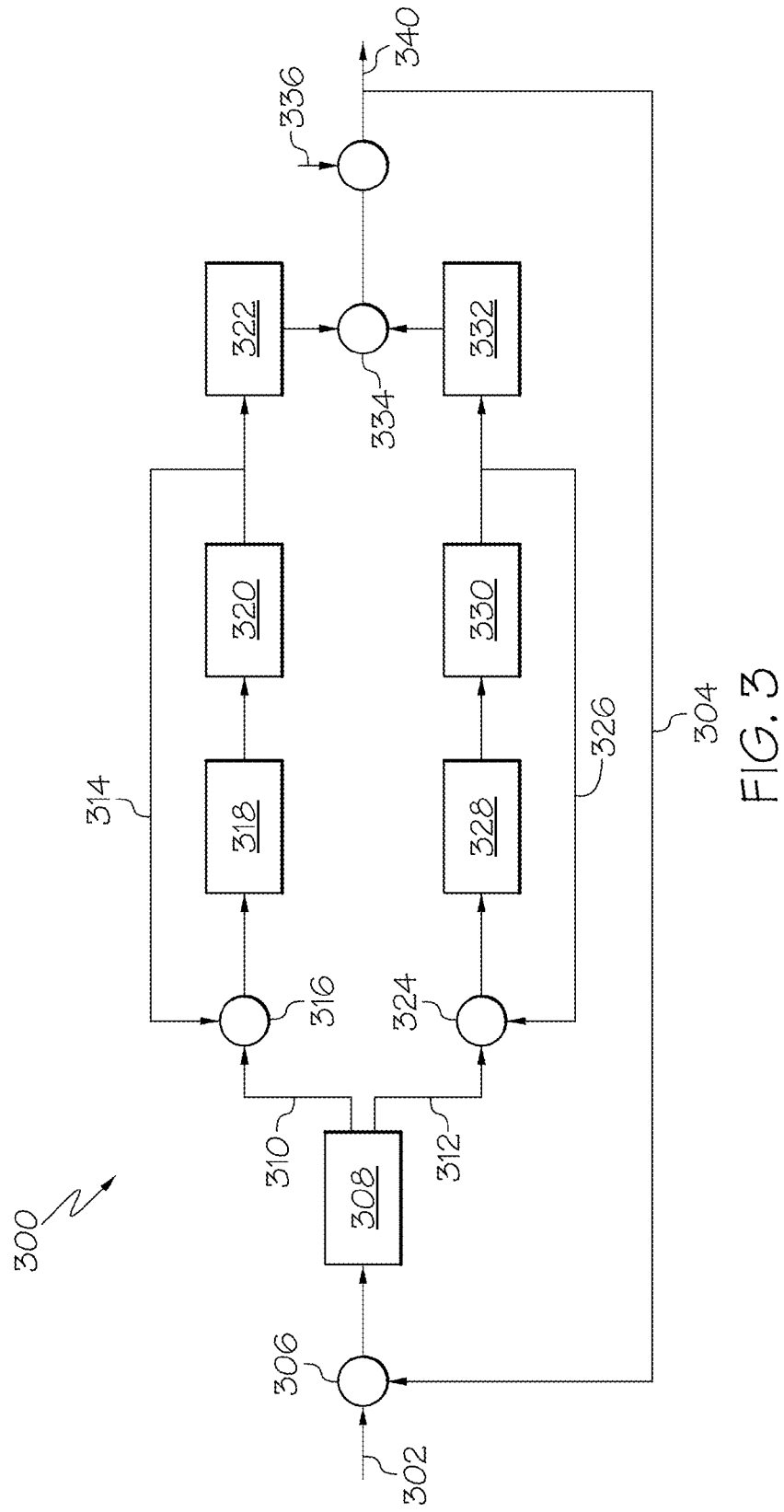
FIG. 3 is a flow diagram of a method for controlling wedge thickness executed by a multivariable control system in accordance with one or more embodiments described herein.

As shown in FIG. 3, a current wedge setpoint 302 and a measured amount of wedge 304 are compared at comparator 306 of the multivariable controller to determine the wedge variation. The comparator 306 outputs a wedge variation signal indicative of the determined wedge variation and inputs this wedge variation signal into the wedge controller of the multivariable controller, which determines a high frequency component of the wedge variation and a low frequency component of the wedge variation based on the received wedge variation signal. The high frequency component and the low frequency component of the wedge variation can be determined, for example, by quantifying the magnitudes and frequencies of wedge data over time. For example, the high frequency component can be identified as the maximum magnitude within a user-defined frequency, such as 1-3 hours, and the low frequency component can be identified as the maximum magnitude within a different user-defined frequency, such as greater than 10 hours. In some embodiments, the high frequency component and the low frequency component of the wedge variation can be determined by identifying the largest peaks on the Fourier transform of the frequencies of a plot of wedge thickness as a function of time. In embodiments, the high frequency and low frequency components can correspond to periods other than 1-3 hours and greater than 10 hours, respectively, provided that there is clearly identified band separation between the frequency components. In various embodiments, there should be a band separation of at least 2 hours between the periods of the frequency components.

At step 308 the controller of the multivariable control system calculates a temperature setpoint 310 to reduce or minimize the low frequency component of the wedge variation and a tilt setpoint 312 to reduce or minimize the high frequency component of the wedge variation. The temperature setpoint 310 and tilt setpoint 312 can be calculated in a variety of ways, depending on the particular embodiment. For example, tilt response (i.e., the thickness variation in the glass ribbon due to the change in tilt) can be modeled based on the geometry of the forming vessel and fluid flow physics to yield an approximate tilt setpoint 312. Similarly, temperature response can be modeled based on the principles of heat transfer and fluid flow to yield an approximate temperature setpoint 310. The tilt setpoint 312 and temperature setpoint 310 are used to replace or update the present tilt and temperature setpoints for the system. Alternatively, tilt and temperature responses can be modeled using process experiments in which either the tilt or temperature is step-changed and the wedge impact is measured. The measured changes in wedge for various combinations of tilt and temperature setpoints can be stored in a look-up table (LUT) in the memory of the automatic thickness control system and may be utilized by the controller to determine future tilt and temperature setpoints to achieve a desired change in the wedge of the glass ribbon.

In various embodiments, the models for tilt and temperature responses can be combined and adjusted to generate a multivariable control algorithm for use by the multivariable controller. The multivariable control algorithm enables process effects for thermal and tilt processes to be characterized according to their impacts on the wedge. These process effects may be weighted to only address observed wedge variation at certain frequencies. For example, in various embodiments, an H-infinity control approach may be used. In various embodiments, use of the H-infinity control approach includes calculating the tilt setpoint independent of the low frequency component of the wedge variation and calculating the temperature setpoint independent of the high frequency component of the wedge variation. The H-infinity control approach is more fully described in *Essentials of Robust Control* by Kemin Zhou (Prentice Hall, 1998), which is hereby incorporated by reference. For example, the high-frequency regime in the optimization cost function of the H-infinity control approach is penalized for the temperature adjustment such that the resulting control algorithm selects only low-frequency adjustments for the temperature and the low-frequency regime in the optimization cost function of the H-infinity control approach is penalized for the tilt adjustment such that the resulting control algorithm selects only high-frequency adjustments for the tilt. The result is a control algorithm that outputs a temperature setpoint and a tilt setpoint.

Still referring to FIG. 3, a temperature setpoint signal indicative of the temperature setpoint 310 and a current temperature signal are input into comparator 316, which compares the temperature setpoint signal to the current temperature signal and calculates the change in temperature to achieve the desired effect. The change in temperature is input into the temperature controller 318 which converts the change in temperature to a desired power level for the heater to achieve the change in temperature. As the power of the heater is increased or decreased, the thermal process 320 increases or decreases the temperature near the weirs of the forming vessel to an adjusted temperature (the new current temperature 314), which is fed back to the comparator 316. The change in temperature assists in changing the wedge through the thermal wedge process 322.

A tilt setpoint signal indicative of the tilt setpoint 312 calculated by the wedge controller is input into a comparator 324 along with a current tilt angle signal indicative of the current tilt angle 326. At the comparator 324, an amount of change of tilt is calculated to achieve the desired effect. A signal indicative of the amount of change of tilt is converted to an amount of torque to be output by the tilt mechanism in step 328 in order to achieve the desired decrease in the wedge of the glass ribbon. At step 330, as the calculated amount of torque is applied to the tilt mechanism, the tilt angle of the forming vessel increases or decreases to an adjusted tilt angle. The adjusted tilt angle, which is the new tilt angle 326 and equivalent to the tilt setpoint 312 represented by the tilt setpoint signal, is fed back to the comparator 324. The adjusted tilt angle adjusts the wedge through the tilt wedge process 332.

The effect of the thermal wedge process 322 and the effect of the tilt wedge process 332 are combined at a summation point 334 to determine a controlled amount of effect on the wedge. The controlled amount of effect on the wedge, along with an amount of wedge disturbance 336, results in an overall measured amount of wedge 340. The wedge disturbance 336 can result from a variety of factors, such as non-uniform glass flow over the forming vessel or non-uniform thermal distribution across the forming vessel. The measured amount of wedge 340 is fed back to comparator 306 as the measured amount of wedge 304.

This process of measuring, adjusting, and re-measuring enables the system to continually compensate for long term variations created by controlling the short term variations and vice versa, resulting in greater overall control of the wedge variation.

EXAMPLES

Various embodiments of the methods for controlling wedge in a glass ribbon will be further clarified by the following examples.

Example 1

Figure 4:
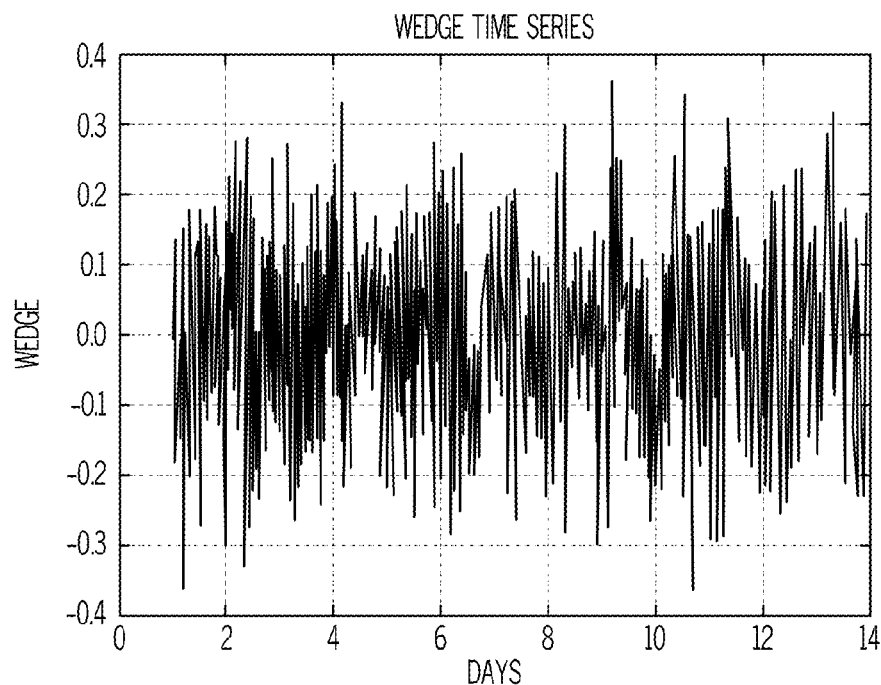
FIG. 4 is a plot of wedge thickness data (y-axis) as a function of time (x-axis)
Figure 5:
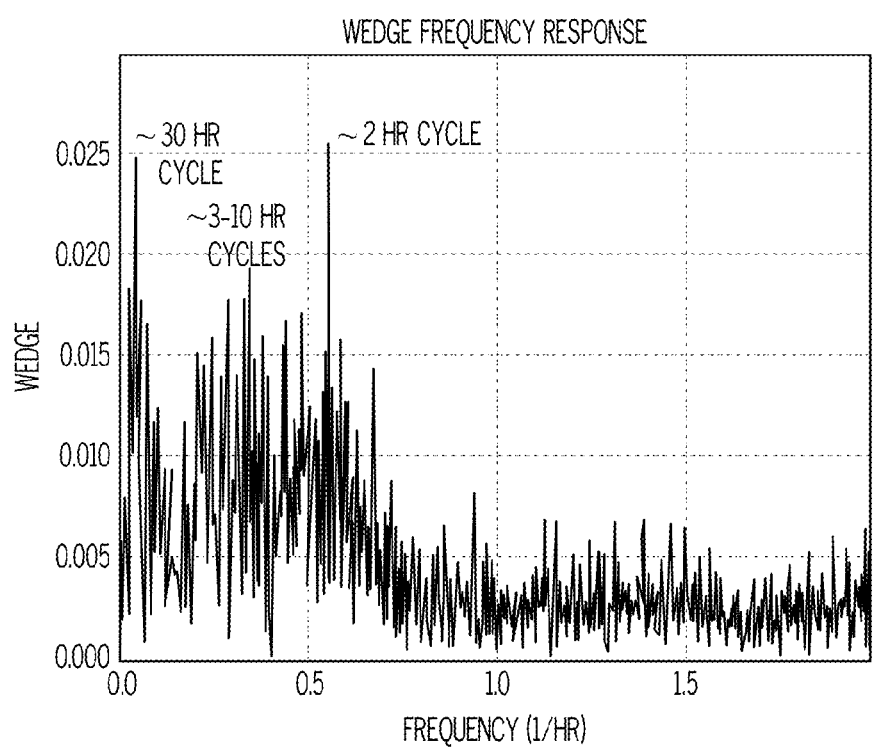
FIG. 5 is a plot of the wedge thickness data (y-axis) as function of frequency (x-axis) of the wedge thickness data shown in FIG. 4.

Wedge variation in a glass ribbon was measured using a thickness gauge for a period of two weeks. FIG. 4 shows a plot of wedge thickness data (y-axis) as a function of time (x-axis). The data from FIG. 4 was transformed using a Fourier transform to generate FIG. 5. More specifically, FIG. 5 is a plot of the frequency components of the signal shown in FIG. 4. The plot in FIG. 5 quantifies the magnitudes (y-axis) and frequencies (x-axis) of the wedge variation. High frequency and low frequency variations can be seen in FIG. 5. As shown in FIG. 5, the wedge disturbance had variations at relatively low frequencies (periods of ten hours or greater) and at relatively high frequencies (e.g., periods of three hours or less). In particular, a prominent cycle occurred with a period of about two hours. The data shown in FIG. 5 can be used to determine a high frequency component and a low frequency component of the wedge variation.

For example, as shown in FIG. 5, large peaks appear at points corresponding to a 2 hour cycle, 3-10 hour cycles, and a 30 hour cycle. Based on these peaks and the band separation, the peak corresponding to the 2 hour cycle was identified as the high frequency component while the peak corresponding to the 30 hour cycle was identified as the low frequency component. Because there is not a well-defined band separation between the peak corresponding to the 2 hour cycle and the peaks corresponding to the 3-10 hour cycles, the 3-10 hour cycles are disregarded for the purposes of identifying frequency components, as they will be controlled as a function of controlling the higher and lower frequency components.

Example 2

Figure 6:
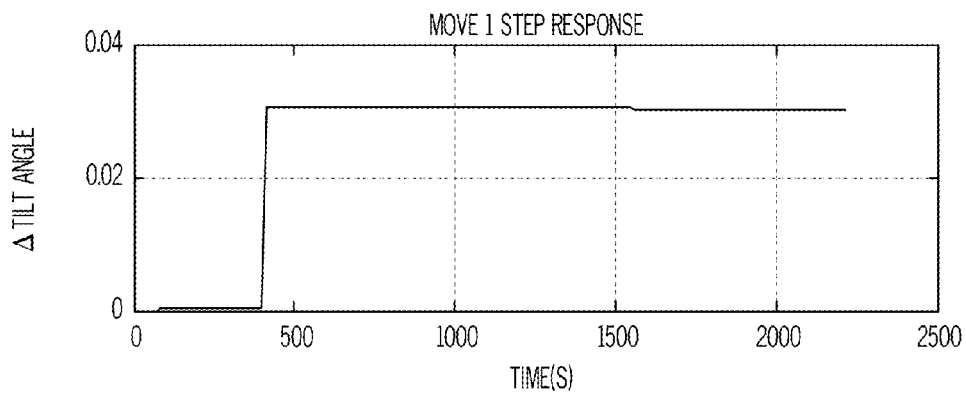
FIG. 6 is a plot of the change in the tilt angle (y-axis) of a fusion draw device as a function of time (x-axis)
Figure 7:
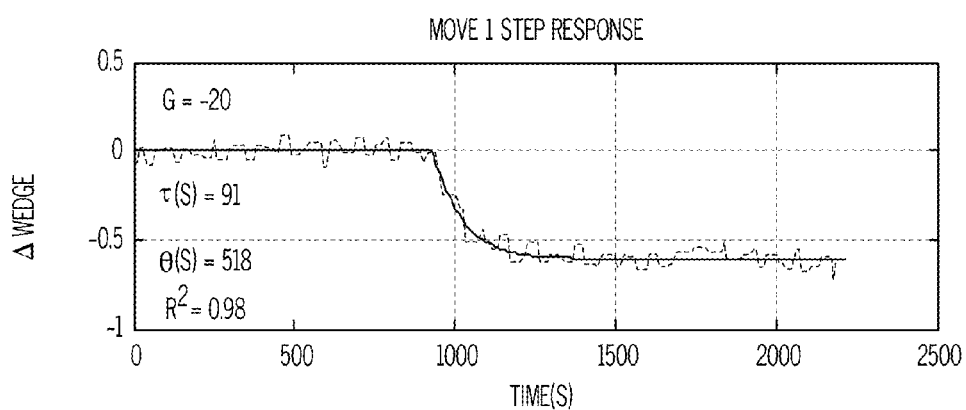
FIG. 7 is a plot of the change in wedge thickness (y-axis) as a function of time (x-axis) corresponding to the tilt angle change illustrated in FIG. 6.

In order to determine an impact of tilt on the wedge variation, the degree of tilt was step-changed from and the wedge impact (i.e., the change in wedge) was observed. This enabled the response of the system to tilt variation to be characterized. More specifically, the tilt angle was up-tilted (i.e., the first end 104 was lowered relative to the second end 106) from a starting angle of 0 degrees by 0.3 degrees (to a final angle of 0.3 degrees), and the wedge response was monitored for approximately 40 minutes. FIGS. 6 and 7 show the observed wedge response to the 0.3 degree change in the tilt angle. As shown in FIG. 6, the forming vessel was up-tilted by 0.3 degrees. The resulting wedge response is graphically depicted in FIG. 7. In FIG. 7, the gain (or change in the wedge) is represented by the y-axis and time (in seconds) is represented by the x-axis. A first order plus dead-time model was fit to the response and, as shown in FIG. 7, the model correlated with the process data ($R^2=0.98$). The $R^2$ value indicates that the first order model very closely correlates with the observed gain as a result of the tilt step-change. The first order plus dead time model that was fit to the response is used, along with the model resulting from Example 3, below, to generate the multivariable control algorithm.

FIG. 7 further illustrates that the impact of tilt on the wedge variation can be effective to address the high frequency component of the wedge variation. In particular, the time delay of 518 seconds represents the elapsed time between the time that the tilt angle is changed and the time that the wedge begins to respond, confirming that the impact is observable within approximately 10 minutes of adjusting the tilt of the forming vessel. Additionally, the model yields a time constant of 91 seconds, indicating that within 91 seconds, the impact of the tilt angle reached approximately 63% of its final value.

Example 3

Figure 8:
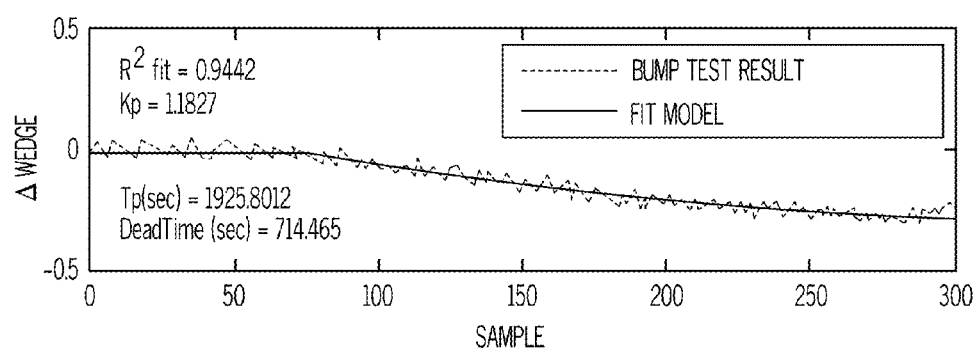
FIG. 8 is a plot of the change in wedge thickness (y-axis) as function of time (x-axis) in response to a −0.3° C. change in the upper side temperature.

To determine an impact of temperature on the wedge variation, the temperature was step-changed by 0.3° C. and the wedge impact (i.e., the change in wedge) was observed for approximately 90 minutes. This enabled the response of the system to thermal variation to be characterized. FIG. 8 illustrates the observed wedge response to a −0.3° C. change in the upper side temperature. In FIG. 8, the y-axis represents the gain (or change in the wedge) and the x-axis represents the sampling duration, where each sample is 15 seconds. A first order (i.e., linear) plus dead-time model was fit to the response. The first order plus dead-time model correlated well with the process data ($R^2=0.94$), indicating that the model was a good fit and could be used to estimate wedge response based on thermal change. Accordingly, once the wedge begins to respond to the thermal change, the thermal change directly and linearly relates to the observed wedge response. It was determined that a reduction in the temperature by 0.3° C. resulted in an increase in wedge of 1.18 (wedge/° C.) for the sample. A time constant of approximately 1926 seconds and a time delay of approximately 714 seconds were found. The time constant represents the time it takes for the thermal change to reach approximately 63% of its final value. The time delay represents the elapsed time between the time that the upper side temperature setpoint is changed and the time that the wedge begins to respond. Comparing the data of FIG. 8 with that of FIG. 7 demonstrates that the thermal adjustments result in a slower change to the wedge relative to tilt adjustments. The first order plus dead time model fit to the response is used, along with the model resulting from Example 2, above, to generate the multivariable control algorithm.

Example 4

With the understanding of the observed wedge response frequency information from Example 1, the tilt step response from Example 2, and the temperature step response form Example 3, estimated limits for control using each of tilt and temperature were confirmed using computer simulations and analytic calculations. In other words, the estimated "high frequency" and "low frequency" ranges derived from FIG. 5 were confirmed by viewing the wedge impact response to each control over those frequencies.

Figure 9:
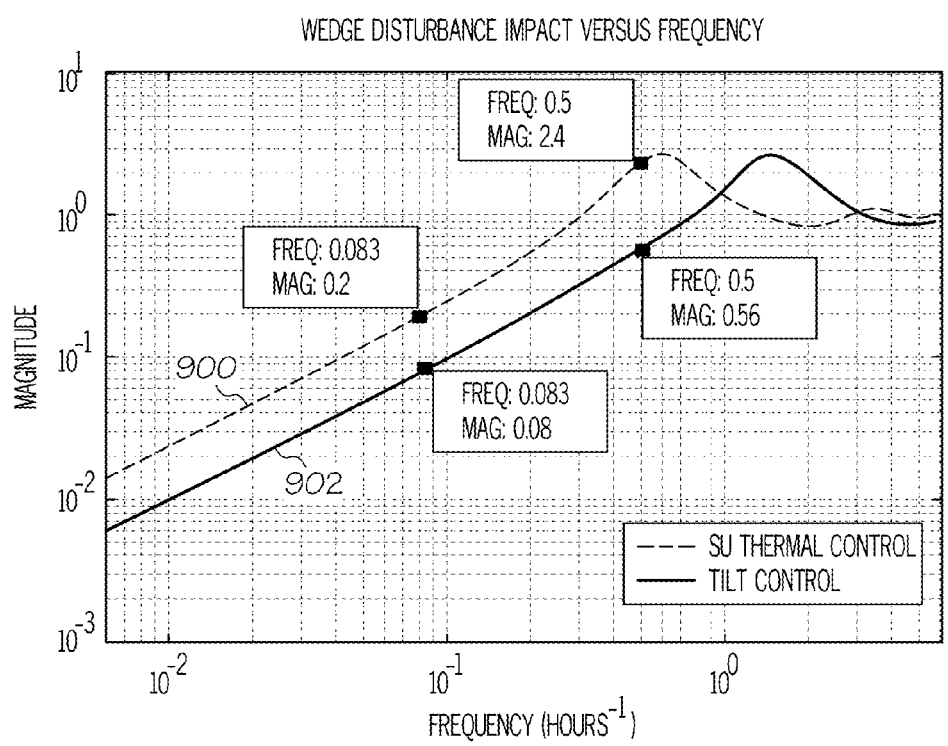
FIG. 9 is a plot of the gain response (y-axis) versus frequency (x-axis) for wedge variation using conventional proportional and integral (PI) control systems for thermal adjustment and tilt.

FIG. 9 is a plot of the gain response (y-axis) versus frequency (x-axis) for wedge variation using proportional and integral (PI) control systems for thermal adjustment and tilt. The PI control systems can control each of thermal and tilt variables, and they can control each variable independently of one another. Additionally, the PI control systems may not specifically employ the thermal variable for control of the low frequency wedge component while ignoring the high frequency wedge component and employ the tilt variable for control of the high frequency wedge component while ignoring the low frequency wedge component as described in connection with the multivariable wedge controller. In FIG. 9, the high frequency component generally refers to the right-hand side of the graph, while the low frequency component generally refers to the left-hand side of the graph. More particularly, the low frequency component is represented to the left of the $10^{-1}$ frequency marking, representing a period of 10 hours and greater. The high frequency component is represented by the dotted lines between the $10^{-1}$ frequency marking and the $10^0$ frequency marking on the x-axis. As noted hereinabove, the specific time periods corresponding to "high frequency" and "low frequency" can vary on the particular embodiment. FIG. 9 confirmed that the estimation of periods to correspond to the high frequency component and the low frequency component, as determined by the examination of FIG. 5 in Example 1, are acceptable to achieve the desired level of control. Specifically, FIG. 9 confirmed that the time periods selected to correspond to "high frequency" and "low frequency" are within the ranges that can be controlled by the corresponding variables (e.g., tilt and temperature, respectively).

Line 900 shows the expected wedge disturbance attenuation when conventional PI control of the temperature is used. Line 900 shows that the expected attenuation of the low-frequency variation (0.083 hours$^{-1}$) is a factor of 0.2 (i.e., an 80% reduction). However, the high frequency variation (0.5 hours$^{-1}$) is amplified by a factor of 2.4, which is considered unacceptable. Accordingly, this indicates that although temperature control can be used to correct the wedge disturbance at low frequencies (where the period is about 10 hours or greater), it is not effective for correction of the wedge disturbance at high frequencies, where the magnitude of the wedge disturbance impact is greater than 1.

Line 902 in FIG. 9 shows the expected wedge disturbance attenuation when the conventional PI control of the tilt mechanism is used. Line 902 shows that the low-frequency variation (0.083 hours$^{-1}$) can by compensated by greater than 90%. The expected wedge disturbance attenuation gain of the high frequency variation (0.5 hours$^{-1}$) is 0.56, an almost 50% reduction compared to the gain from the use of the conventional PI control of the temperature. The magnitude of line 902 maintains a value of less than 1 at higher frequencies, indicating that tilt control can be effective at controlling wedge disturbance at these higher frequencies. Additionally, line 902 indicates that tilt control can be effective at controlling wedge disturbance at both high and low frequencies.

Example 5

Having confirmed the theory that thermal control can be employed to control the wedge impact for periods of 10 hours or greater and tilt control can be employed to control the wedge impact for shorter periods of time in Example 4, a multivariable control algorithm was developed. FIGS. 10-16 illustrate the simulated results of combining the models from Examples 2 and 3 for use in controlling the wedge variation. In particular, the resultant models from Examples 2 and 3 were combined and the H-infinity control approach was employed to generate an algorithm that selects temperature adjustments to address low-frequency variations and selects tilt adjustments to address high-frequency variations. More specifically, the models fit to the data in Examples 2 and 3 were combined to form an algorithm which was shaped using the H-infinity control method.

In the H-infinity control method, the temperature variable was manipulated to minimize the low-frequency variations, without regard for the high-frequency variations, while the tilt variable was manipulated to minimize the high-frequency variations, without regard for the low-frequency variations. The resultant multivariable control algorithm was applied to the data collected in Example 1 to generate the simulated data presented in FIGS. 10-16.

Figure 10:
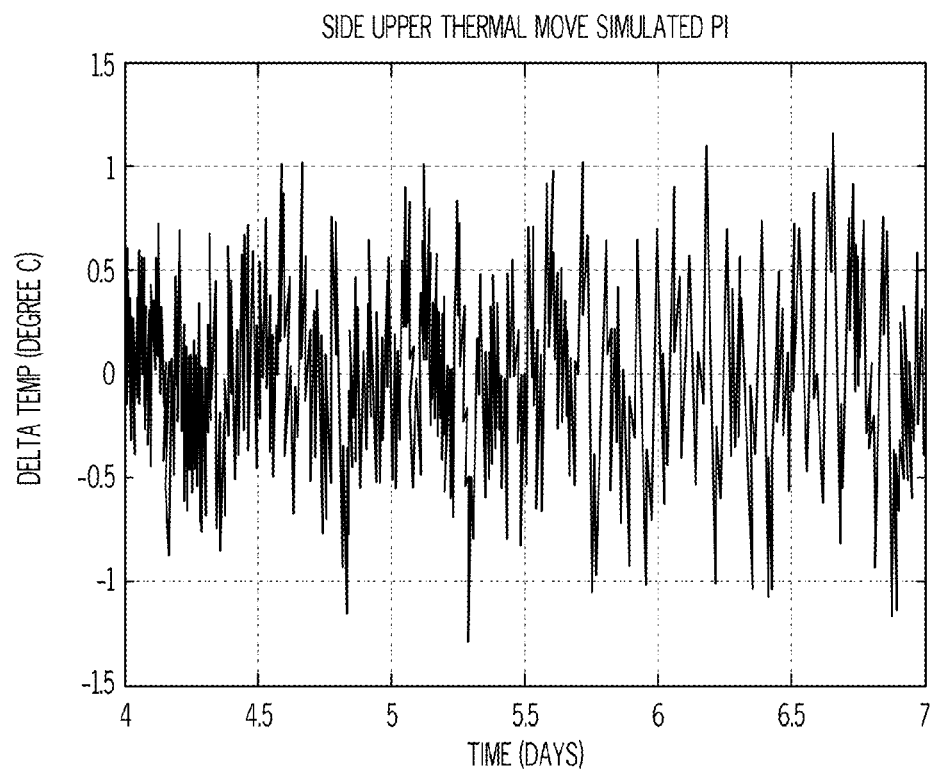
FIG. 10 is a plot of the resultant temperature moves (y-axis) over time (x-axis) according to the conventional PI control system.
Figure 11:
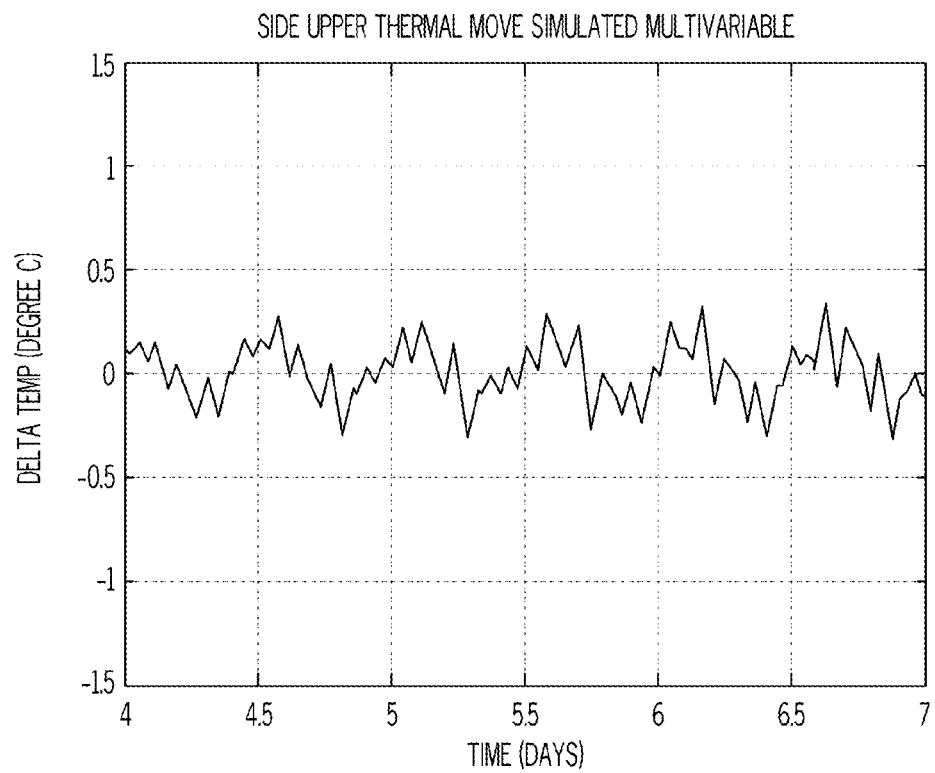
FIG. 11 is a plot of the resultant temperature moves (y-axis) over time (x-axis) according to the multivariable control algorithm.

FIG. 10 is a plot of the resultant temperature moves (y-axis) over time (x-axis) according to the conventional PI control system. FIG. 11 is a plot of the resultant temperature moves (y-axis) over time (x-axis) according to the multivariable control algorithm. As can be seen in FIGS. 10 and 11, the simulated data indicates that the PI thermal control has greater short-term and long-term variation (e.g., the temperature is changed a greater number of times and the changes exhibit greater magnitudes) as compared to the multivariable control algorithm.

Figure 12:
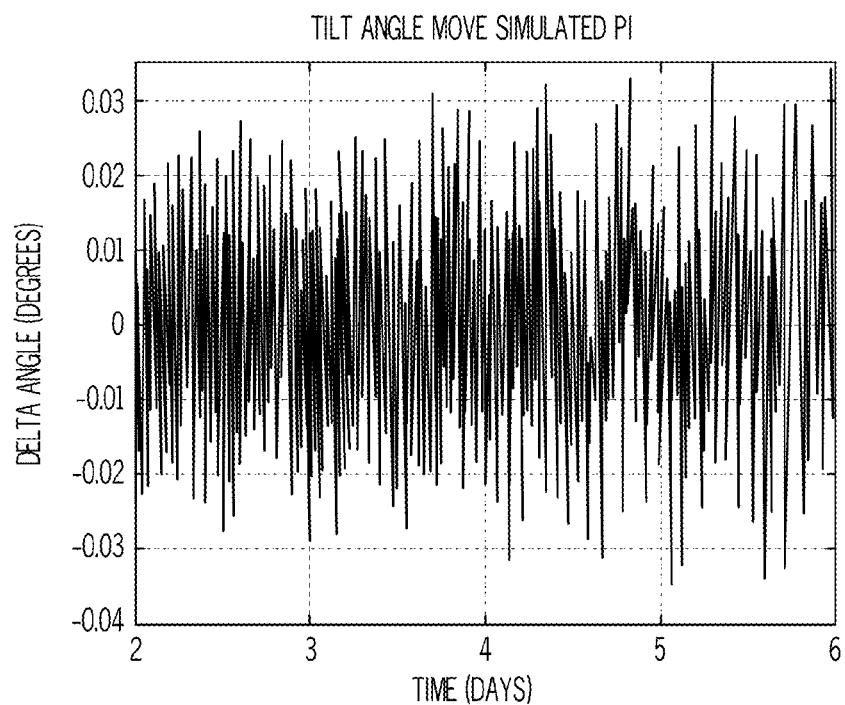
FIG. 12 is a plot of the resultant tilt moves (y-axis) over time (x-axis) according to the conventional PI control system.
Figure 13:
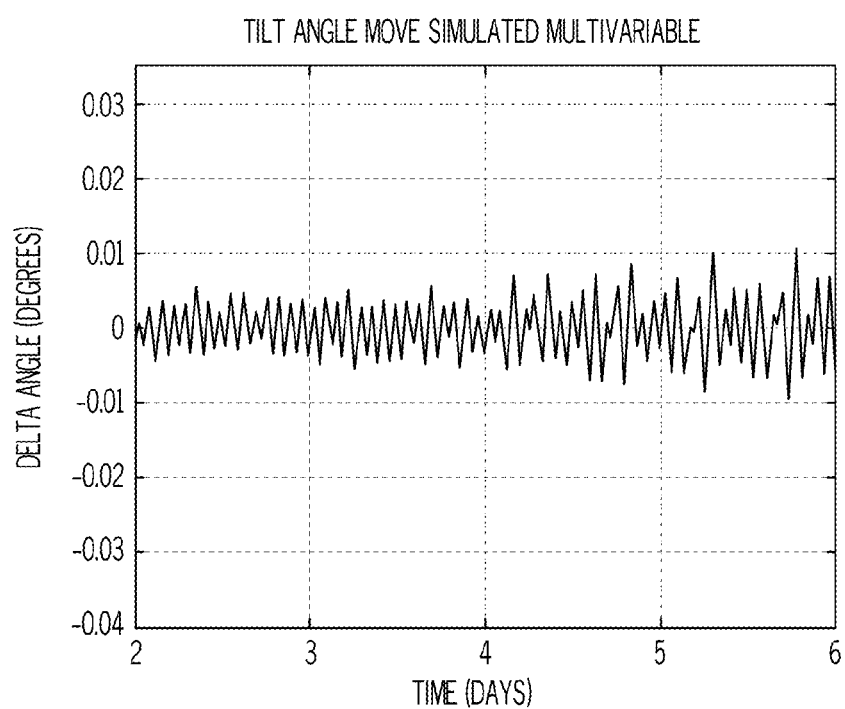
FIG. 13 is a plot of the resultant tilt moves (y-axis) over time (x-axis) according to the multivariable control algorithm.

FIG. 12 is a plot of the resultant tilt moves (y-axis) over time (x-axis) according to the conventional PI control system. FIG. 13 is a plot of the resultant tilt moves (y-axis) over time (x-axis) according to the multivariable control algorithm. As shown in FIG. 13, the simulated data indicates that the multivariable control algorithm has very little long term variation relative to the conventional PI control system. Tilt movement is tuned to address the high-frequency components. This results in a tilt move signal with much smaller amplitude (approximately a factor of five) when compared to the standard PI control.

Figure 14:
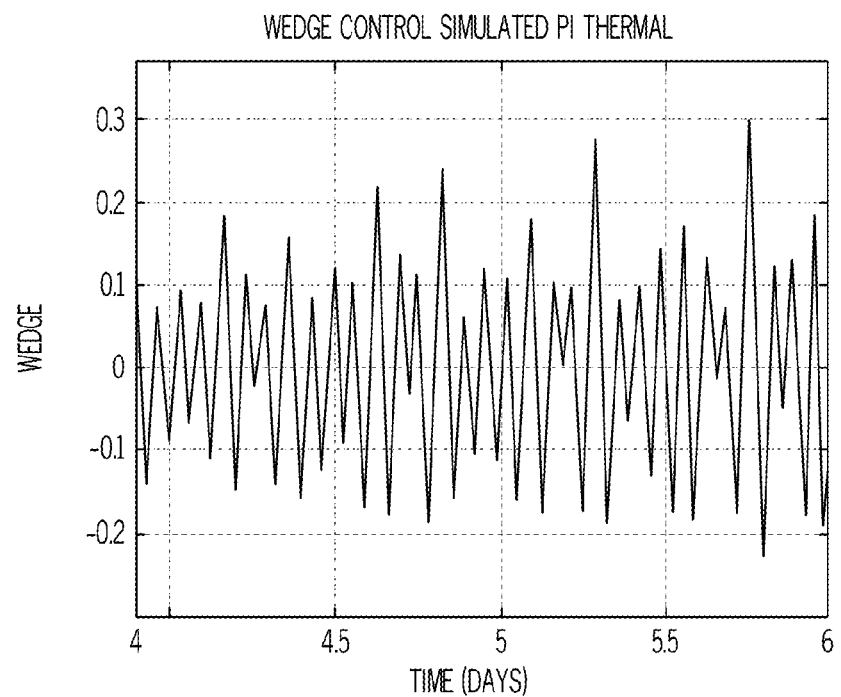
FIG. 14 is a plot of the simulated wedge variation (y-axis) as a function of time (x-axis) using the conventional PI temperature control system.
Figure 15:
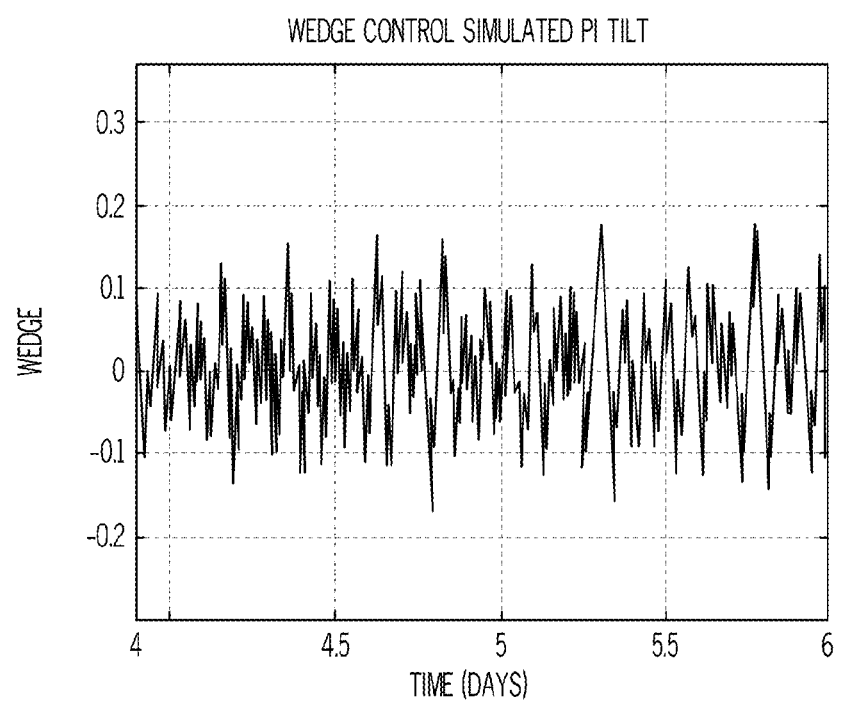
FIG. 15 is a plot of the simulated wedge variation (y-axis) as a function of time (x-axis) using the conventional PI tilt control system.
Figure 16:
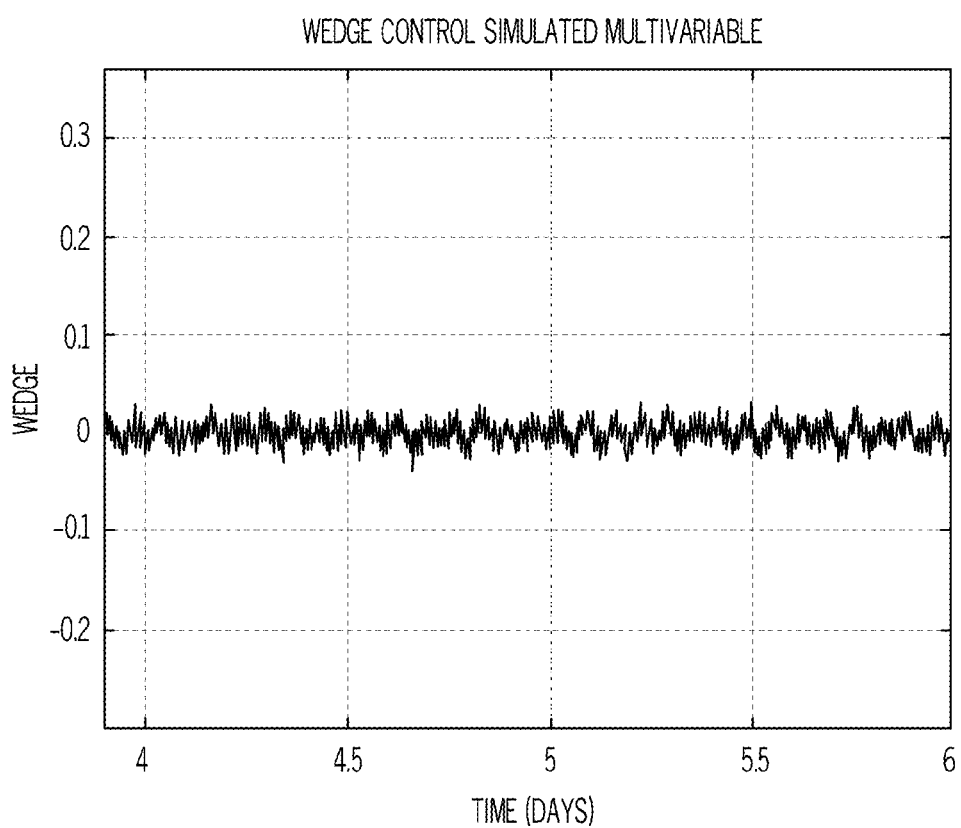
FIG. 16 is a plot of the simulated wedge variation (y-axis) as a function of time (x-axis) using the multivariable control system.

FIGS. 14, 15, and 16 illustrate the simulated wedge variation using the conventional PI temperature control system, the conventional PI tilt control system, and the multivariable control system, respectively. As can be seen by comparing FIGS. 14-16, the multivariable control system achieves much smaller wedge variation, with an improvement of 70% over using tilt only. Accordingly, the combined approach provides greater control than using either tilt or thermal compensation alone.

Example 6

Having estimated the improved control on wedge variation using tilt control over using thermal control alone, an experiment was conducted to confirm the results of the simulation. The experiment employed the same parameters as used in Example 2. In particular, the model resulting from Example 2 was employed to determine an updated tilt setpoint to address the observed wedge (the results of which are shown in FIG. 17).

Figure 17:
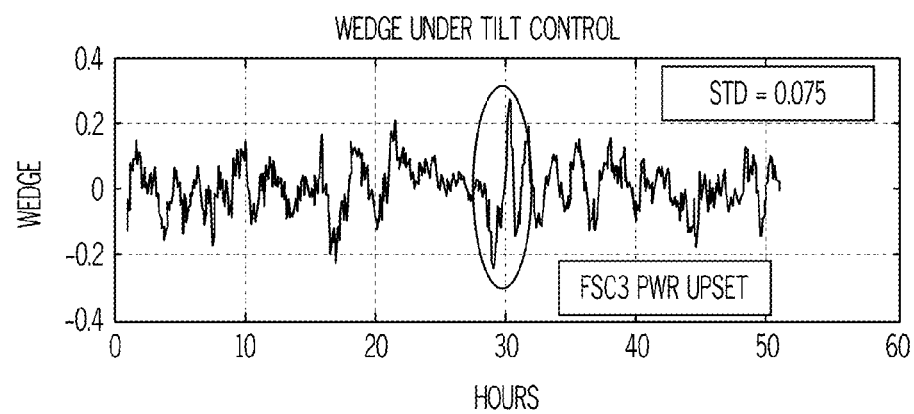
FIG. 17 is a plot showing the amount of wedge (y-axis) as a function of time (x-axis) under tilt control.
Figure 18:
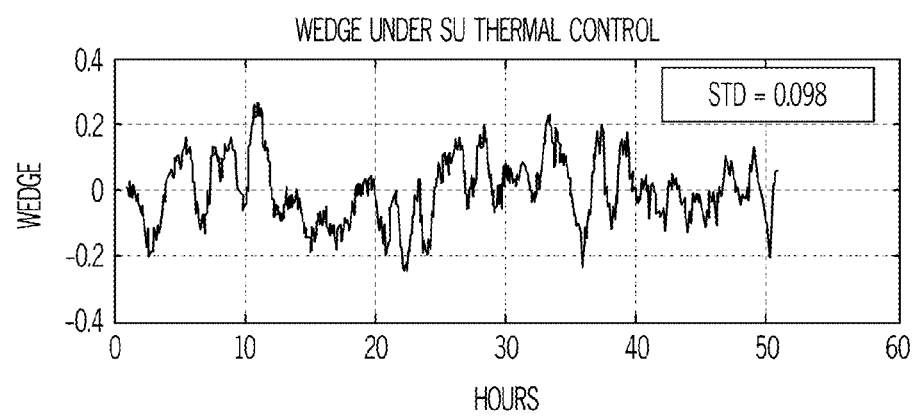
FIG. 18 is a plot showing the amount of wedge (y-axis) as a function of time (x-axis) under the thermal control using the conventional automated thickness control system (ATCS)

FIGS. 17 and 18 illustrate the results of an experiment to determine the feasibility of tilt control of wedge variation. In particular, FIG. 17 is a plot showing the amount of wedge (y-axis) as a function of time (x-axis) under tilt control over a period of approximately 2.5 days. FIG. 18 is a plot showing the amount of wedge (y-axis) as a function of time (x-axis) under thermal control using the conventional automated thickness control system (ATCS). The conventional ATCS does not specifically employ the thermal variable for control of the low frequency wedge component while ignoring the high frequency wedge component as described in connection with the multivariable wedge controller. As can be seen by comparing FIGS. 17 and 18, despite a power upset during the tilt control run, wedge variation improvements were achieved using tilt control when compared to controlling wedge variation with thermal control provided by the conventional ATCS. Notably, the minimum amount of angular change to the tilt mechanism was adjusted during the experiment and the coarseness of the control moves limited the achievable bandwidth and the ability to address high-frequency variation. Nevertheless, the experiment showed good results that were expected to improve with less conservative motion controls.

Figure 19:
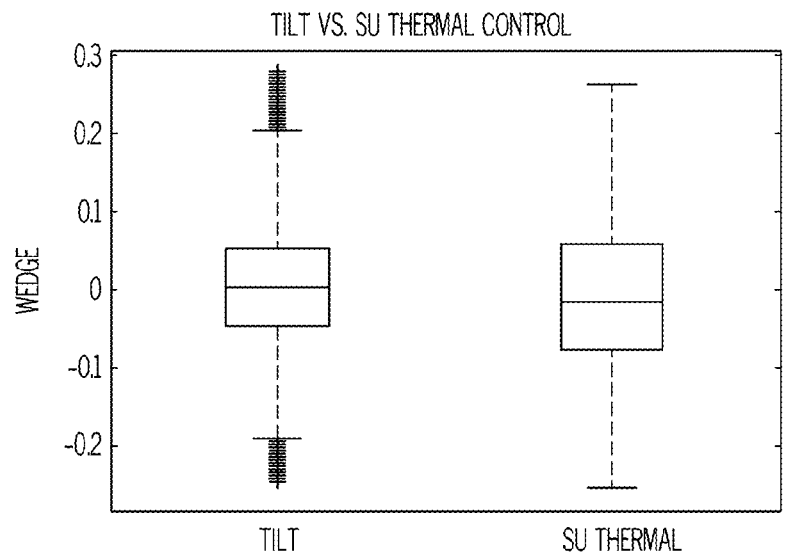
FIG. 19 is a box plot of the amount of wedge (y-axis) of the tilt control results compared with the results of thermal control using the conventional ATCS to control wedge.

FIG. 19 is a box plot of the tilt control results (as shown in FIG. 17) compared with the results of thermal control using the ATCS (as shown in FIG. 18) to control wedge. The tilt control showed a 27% improvement in the interquartile range (i.e., the midspread or middle fifty). The interquartile range is representative of the dispersion of the data points, and an improvement in the interquartile range indicates a decrease in variance. Despite the limitations of the tilt motion control system, short-term variation improvement over thermal control was realized.

Figure 20:
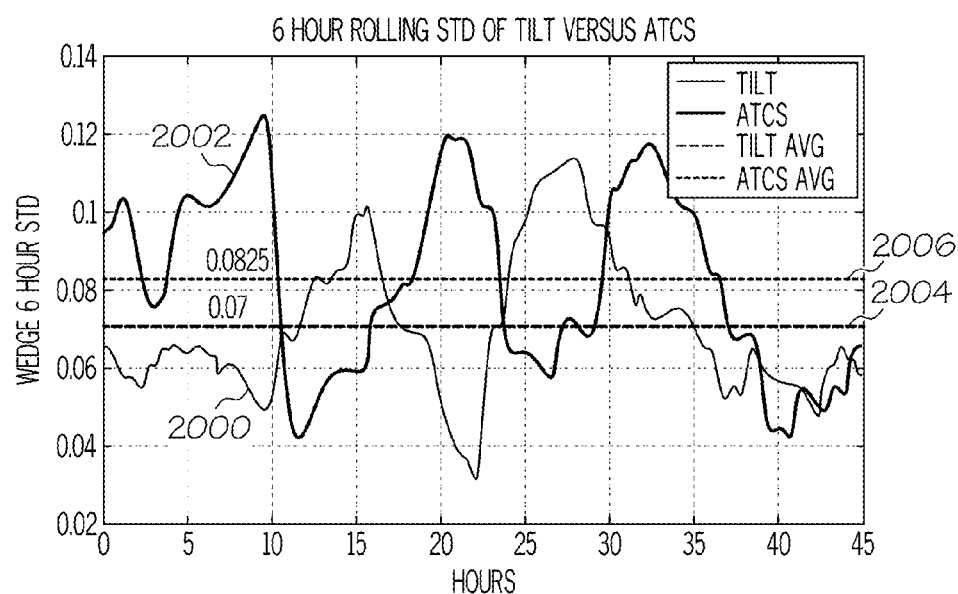
FIG. 20 is a plot of the rolling standard deviation for the wedge (y-axis) as a function of time (x-axis)

FIG. 20 shows a plot of the rolling standard deviation ("STD") (y-axis) as a function of time (x-axis) for the wedge for the data shown in FIGS. 17 and 18. A window of six hours was used and stepped by ten seconds over the entire data set (approximately 45 hours). The wedge result under tilt is shown by line 2000 and the wedge result under thermal control using the conventional ATCS is shown by line 2002. The average variation value for the six hour rolling STD data set for tilt control is shown by line 2004 and the average variation value for the six hour rolling STD data set for conventional ATCS thermal control is shown by line 2006. The data indicated that the tilt wedge control system had lower short-term variation by roughly 15% on average compared to the ATCS thermal control (0.07 versus 0.0825). Again, this was observed despite a temperature swing during the tilt control experiment. Accordingly, FIGS. 19 and 20 demonstrate that control of wedge with tilt can result in greater control and less variation than control of wedge using thermal control alone.

Example 7

Having confirmed the feasibility of controlling wedge with tilt control, the generated multivariable control algorithm was tested to determine whether it provided an advantage over conventional wedge control methods using only thermal control. In particular, no tilt moves were made during the experiment in order to determine whether the multivariable control algorithm functioned as expected with respect to the thermal variable. Therefore, the wedge was measured over a period of several days for systems which controlled the wedge through thermal control as directed by the multivariable wedge control, the conventional ATCS, and the conventional PI control system. More specifically, the wedge was measured over a period of 7 days for the conventional PI control system and a period of 18 days for the multivariable wedge control system. The total wedge, short term frequency (1-3 hours), and long term (greater than 10 hours) wedge variation were observed and compared.

Figure 21:
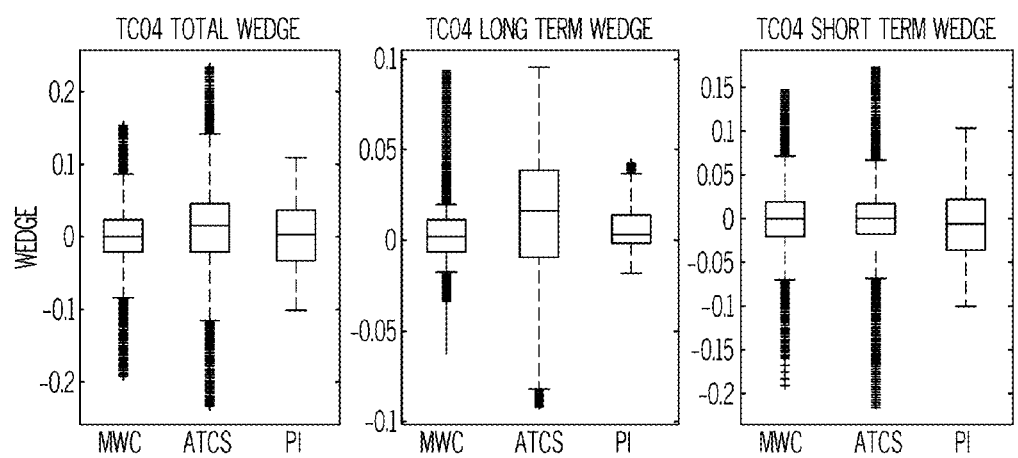
FIG. 21 illustrates the results of total wedge control, long term wedge control, and short term wedge control using the multivariable wedge control (MWC), the conventional ATCS, and the PI control system, where the amount of wedge is measured along the y-axis.

Specifically, FIG. 21 illustrates the results of wedge control using the multivariable wedge control (MWC), the conventional ATCS, and the conventional PI control system. Table 1 provides additional comparative data.

TABLE 1

Comparison of wedge variation for MWC, ATCS, and PI control systems.

| | MWC | ATCS | PI | % Diff from ATCS | % Diff from PI |
| --- | --- | --- | --- | --- | --- |
| Median | 0.000759 | −0.01583 | 0.002275 | 95 | 67 |
| Total STD | 0.36549 | 0.050328 | 0.046535 | 27 | 21 |
| Low Freq. STD | 0.009657 | 0.035076 | 0.012548 | 72 | 23 |
| High Freq. STD | 0.034284 | 0.032869 | 0.043157 | −4 | 21 |

The left box plot of FIG. 21 compares the total wedge variation. It can be seen that the MWC had a smaller median and tighter variation range than the conventional ATCS and PI control system. The middle plot shows the low-frequency variation (long-term period) for the wedge. The right box plot of FIG. 21 shows the wedge variation at high frequency. Here, the variation observed using the MWC was similar to that observed when using the conventional ATCS (worse by 4%) and better than that observed when using the conventional PI control system (an improvement of 21%). Accordingly, the MWC did not appear to compensate for the high-frequency variation compared to the conventional ATCS, but it did not amplify the high-frequency variation as did the conventional PI control system, as expected from the algorithm design.

Based on the foregoing, it should now be understood that various aspects of methods of controlling the thickness wedge in a glass ribbon are disclosed herein. According to a first aspect, a method for controlling wedge variation in a glass ribbon includes flowing molten glass over converging sides of a forming vessel; drawing a glass ribbon from a root of the forming vessel, the glass ribbon having a width; measuring the wedge variation over at least a portion of the width of the glass ribbon; and adjusting a tilt of the forming vessel and a temperature near a weir of the forming vessel based on the measured wedge variation to decrease the wedge variation over the width of the glass ribbon.

In a second aspect, a fusion draw device comprises a forming vessel having a first end and a second end defining a length of the forming vessel, and a trough positioned in an upper surface thereof; a tilt mechanism tilting the forming vessel to change a position of the first end of the forming vessel relative to the second end of the forming vessel; at least one heating mechanism providing heat to an area near a weir of the forming vessel; and an automatic thickness control system comprising a controller with a processor and memory storing a computer readable and executable instruction set. The computer readable and executable instruction set, when executed by the processor: receives a wedge variation calculation from a thickness gauge in a bottom of draw; determines, based on the received wedge variation calculation, a high frequency component of the wedge variation and a low frequency component of the wedge variation; calculates a tilt setpoint to reduce the high frequency component of the wedge variation; calculates a temperature setpoint to reduce the low frequency component of the wedge variation; provides the tilt setpoint to the tilt mechanism; and provides the temperature setpoint to the at least one heating mechanism.

In a third aspect, a method of controlling a wedge variation over a width of a glass ribbon comprises flowing molten glass over converging sides of an forming vessel; drawing a glass ribbon from a root of the forming vessel, the glass ribbon having a width; measuring the wedge variation over a portion of the width of the glass ribbon; adjusting a tilt of the forming vessel based on a high frequency component of the wedge variation to decrease the wedge variation over the width of the glass ribbon; adjusting a temperature at a weir of the forming vessel based on a low frequency component of the wedge variation to decrease the wedge variation over the width of the glass ribbon; and measuring an adjusted wedge variation over the portion of the width of the glass ribbon.

A fourth aspect includes any of the first through third aspects, further comprising determining a change in the tilt of the forming vessel based on a high frequency component of the wedge variation.

A fifth aspect includes any of the first through fourth aspects, wherein adjusting the tilt of the forming vessel comprises adjusting a position of a first end of the forming vessel relative to a second end of the forming vessel, wherein the first end and the second end of the forming vessel are perpendicular to the converging sides of the forming vessel and are separated by a length of the forming vessel.

A sixth aspect includes any of the first through fifth aspects, further comprising determining a change in the temperature at the weir according to a low frequency component of the wedge variation.

A seventh aspect includes any of the first through sixth aspects, wherein adjusting the temperature at the weir comprises adjusting a power output of at least one heating mechanism positioned near an upper portion of the forming vessel.

An eighth aspect includes any of the first through seventh aspects, wherein adjusting the temperature at the weir comprises adjusting a power output of a cooling mechanism positioned around the forming vessel.

A ninth aspect includes any of the first through eighth aspects, wherein adjusting the temperature at the weir comprises adjusting a power output of at least one heating mechanism and adjusting a power output of a cooling mechanism positioned around the forming vessel.

A tenth aspect includes any of the first through ninth aspects wherein the automatic thickness control system adjusts a degree of tilt of the forming vessel based on the tilt setpoint.

An eleventh aspect includes any of the first through tenth aspects, wherein the automatic thickness control system adjusts an amount of heat provided to the area at the weir of the forming vessel based on the temperature setpoint.

A twelfth aspect includes any of the first through eleventh aspects, further comprising a cooling mechanism positioned near the weir, wherein the automatic thickness control system causes the area at the weir of the forming vessel to be actively cooled based on the temperature setpoint.

A thirteenth aspect includes any of the first through twelfth aspects, wherein the automatic thickness control system calculates the tilt setpoint to minimize the high frequency component of the wedge variation.

A fourteenth aspect includes any of the first through thirteenth aspects, wherein the automatic thickness control system calculates the temperature setpoint to minimize the low frequency component of the wedge variation.

A fifteenth aspect includes any of the first through fourteenth aspects, wherein the automatic thickness control system calculates the tilt setpoint independent of the low frequency component of the wedge variation.

A sixteenth aspect includes any of the first through fifteenth aspects, wherein the automatic thickness control system calculates the temperature setpoint independent of the high frequency component of the wedge variation.

A seventeenth aspect includes any of the first through sixteenth aspects, wherein the portion of the width of the glass ribbon does not include a bead region of the glass ribbon.

An eighteenth aspect includes any of the first through seventeenth aspects, wherein adjusting the tilt of the forming vessel comprises determining a tilt setpoint based on a degree of tilt and amount of wedge change.

A nineteenth aspect includes any of the first through eighteenth aspects, wherein adjusting the temperature near the weir comprises determining a temperature setpoint based on the temperature and amount of wedge change.

A twentieth aspect includes any of the first through nineteenth aspects, further comprising: adjusting the tilt of the forming vessel based on a high frequency component of the adjusted wedge variation; and adjusting the temperature at the weir of the forming vessel based on a low frequency component of the adjusted wedge variation.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A method for controlling wedge variation in a glass ribbon comprising: flowing molten glass over converging sides of a forming vessel;

drawing a glass ribbon from a root of the forming vessel, the glass ribbon having a width;

measuring the wedge variation over at least a portion of the width of the glass ribbon for a time period of at least ten hours and generating a wedge variation signal based on said measuring;

determining a high frequency component of the measured wedge variation and a low frequency component of the measured wedge variation by identifying peaks in a Fourier transform of the wedge variation signal wherein low frequency refers to periods greater than a first predetermined number of hours and high frequency refers to periods less than a second predetermined number of hours, wherein the second predetermined number of hours is less than the first predetermined number of hours, and a difference between the first and second predetermined number of hours is greater than or equal to two hours;

determining a change in a tilt of the forming vessel based on the high frequency component of the measured wedge variation;

determining a change in a temperature near a weir of the forming vessel based on the low frequency component of the measured wedge variation; and adjusting the tilt of the forming vessel based on the determined change in the tilt and adjusting the temperature near the weir of the forming vessel based on the determined change in the temperature near the weir to decrease the wedge variation over the width of the glass ribbon.

2. The method of claim 1, wherein adjusting the tilt of the forming vessel comprises adjusting a position of a first end of the forming vessel relative to a second end of the forming vessel, wherein the first end and the second end of the forming vessel are perpendicular to the converging sides of the forming vessel and are separated by a length of the forming vessel.

3. The method of claim 1, wherein adjusting the temperature near the weir comprises adjusting a power output of at least one heating mechanism positioned near an upper portion of the forming vessel.

4. The method of claim 1, wherein adjusting the temperature near the weir comprises adjusting a power output of a cooling mechanism positioned around the forming vessel.

5. The method of claim 1, wherein adjusting the temperature near the weir comprises adjusting a power output of at least one heating mechanism and adjusting a power output of a cooling mechanism positioned around the forming vessel.

6. A method of controlling a wedge variation over a width of a glass ribbon, comprising:

flowing molten glass over converging sides of a forming vessel;

drawing a glass ribbon from a root of the forming vessel, the glass ribbon having a width;

measuring the wedge variation over a portion of the width of the glass ribbon for a time period of at least ten hours and generating a wedge variation signal based on said measuring;

determining a high frequency component of the measured wedge variation and a low frequency component of the measured wedge variation by identifying peaks in a Fourier transform of the wedge variation signal wherein low frequency refers to periods greater than a first predetermined number of hours and high frequency refers to periods less than a second predetermined number of hours, wherein the second predetermined number of hours is less than the first predetermined number of hours, and a difference between the first and second predetermined number of hours is greater than or equal to two hours;

adjusting a tilt of the forming vessel based on the high frequency component of the wedge variation to decrease the wedge variation over the width of the glass ribbon;

adjusting a temperature near a weir of the forming vessel based on the low frequency component of the wedge variation to decrease the wedge variation over the width of the glass ribbon; and measuring an adjusted wedge variation over the portion of the width of the glass ribbon.

7. The method of claim 6, wherein the portion of the width of the glass ribbon does not include a bead region of the glass ribbon.

8. The method of claim 6, wherein adjusting the tilt of the forming vessel comprises determining a tilt setpoint based on a degree of tilt and amount of wedge change.

9. The method of claim 6, wherein adjusting the temperature near the weir comprises determining a temperature setpoint based on the temperature and amount of wedge change.

10. The method of claim 6, further comprising:

adjusting the tilt of the forming vessel based on a high frequency component of the adjusted wedge variation; and adjusting the temperature near the weir of the forming vessel based on a low frequency component of the adjusted wedge variation.

* * * * *